United States Patent [19]

Brown et al.

[11] 4,327,770

[45] May 4, 1982

[54] QUICK DISCONNECT FLUID LINE COUPLING

[75] Inventors: Peter W. Brown, North Muskegon, Mich.; Chester G. DuBois, Zion, Ill.; David J. Hartke, Waukegan, Ill.; Paul R. Hunt, Lindenhurst, Ill.

[73] Assignee: Outboard Marine Corporation, Waukegan, Ill.

[21] Appl. No.: 96,834

[22] Filed: Nov. 23, 1979

[51] Int. Cl.³ .............................................. F16L 29/00
[52] U.S. Cl. ........................ 137/614.05; 137/614.03; 251/149.8
[58] Field of Search ............. 137/614.02, 614, 614.03, 137/614.05, 614.04; 251/149.8, 149.6

[56] References Cited

U.S. PATENT DOCUMENTS

| 2,265,267 | 12/1941 | Cowles | 251/149.6 |
| 2,319,015 | 5/1943 | Speth | 137/614.03 |
| 2,322,877 | 6/1943 | Parker | 251/149.6 |
| 2,854,259 | 9/1958 | Clark | 137/614.03 |
| 3,039,794 | 6/1962 | DeCenzo | 137/614.03 |
| 3,196,897 | 7/1965 | Hodson | 137/614.04 |
| 3,450,424 | 6/1969 | Calisher | 137/614.03 |
| 3,500,859 | 3/1970 | Pearson | 251/149.8 |
| 3,550,624 | 12/1970 | Johnson | 137/614 |
| 3,961,645 | 6/1976 | Kagan | 251/149.6 |
| 4,124,228 | 11/1978 | Morrison | 137/614.03 |

Primary Examiner—A. Michael Chambers
Attorney, Agent, or Firm—Michael, Best & Friedrich

[57] ABSTRACT

The invention provides a quick disconnect fluid coupling for connection of fluid conduits and incorporates automatically actuated valves for closing the end of each fluid conduit when the connection is broken, and specifically provides for minimal fluid loss from the line at the time of making or breaking the connection.

5 Claims, 4 Drawing Figures

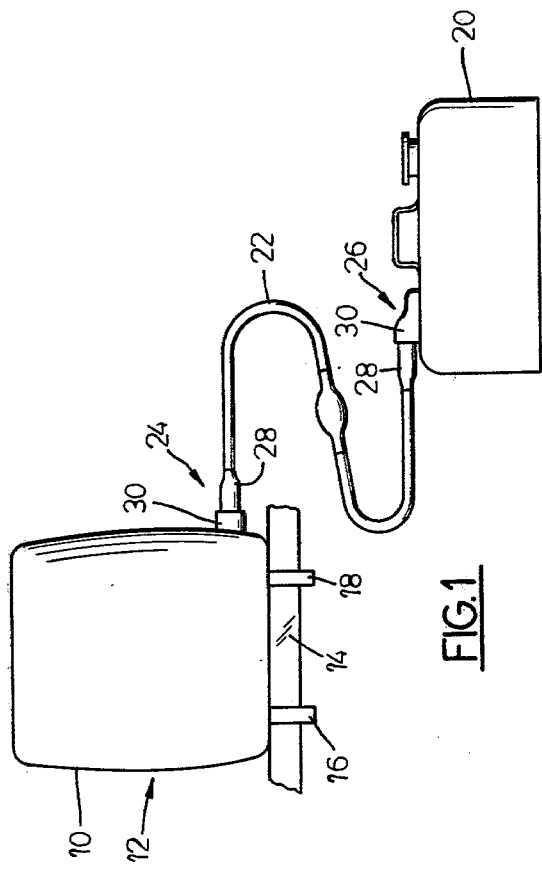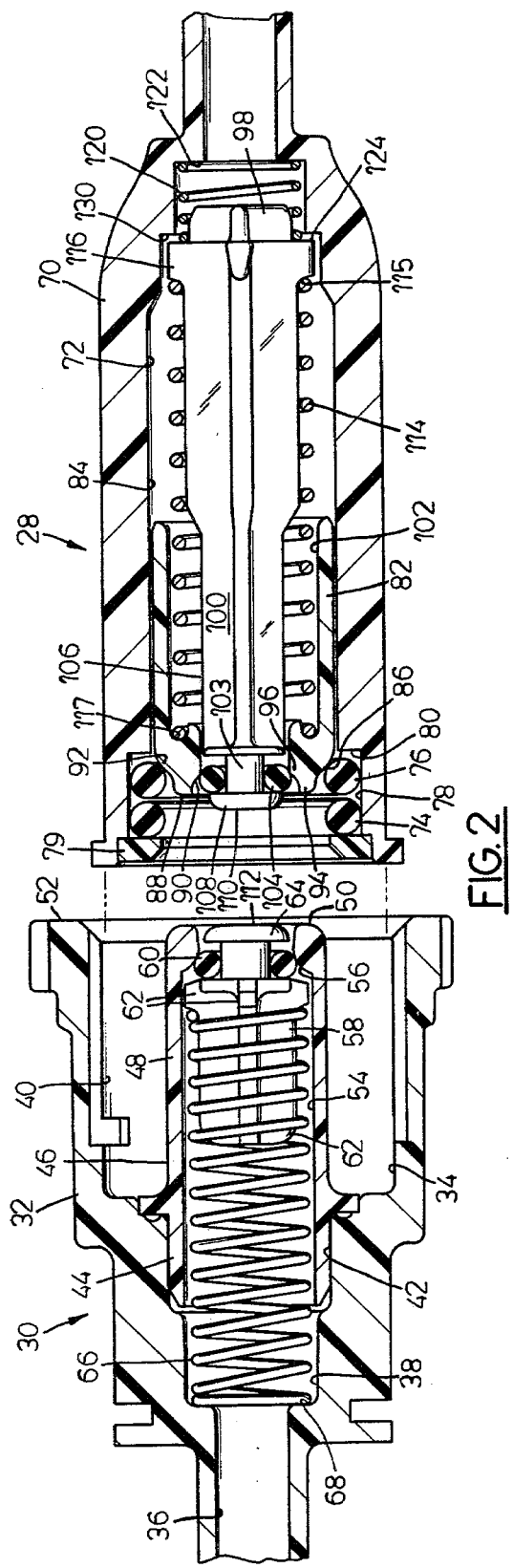

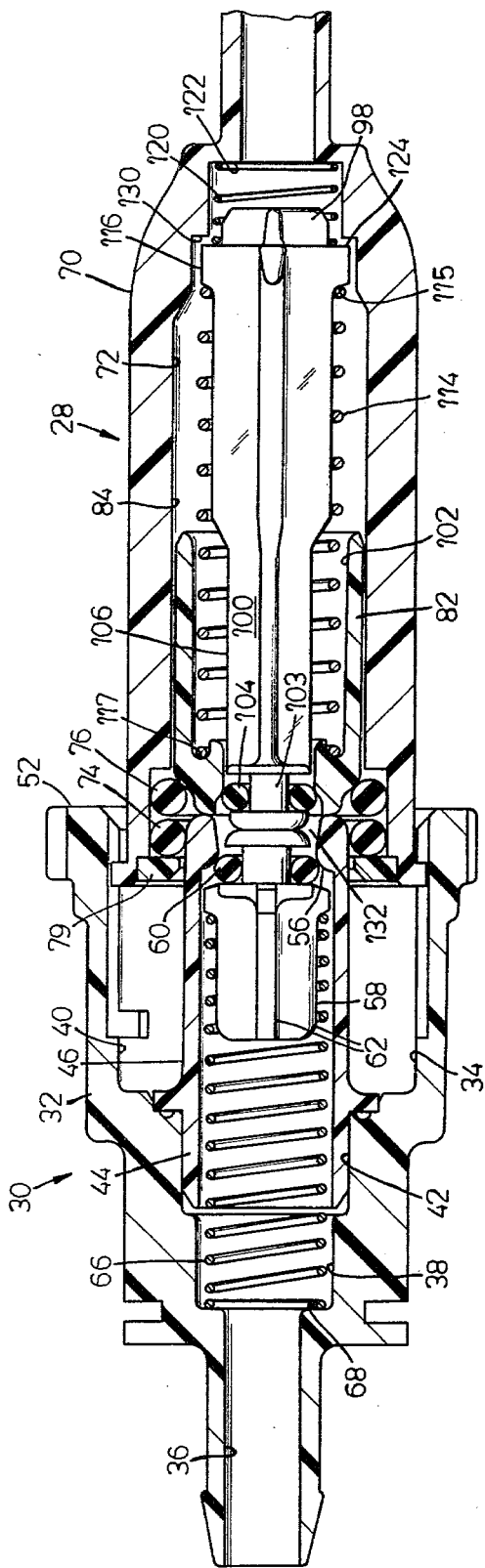
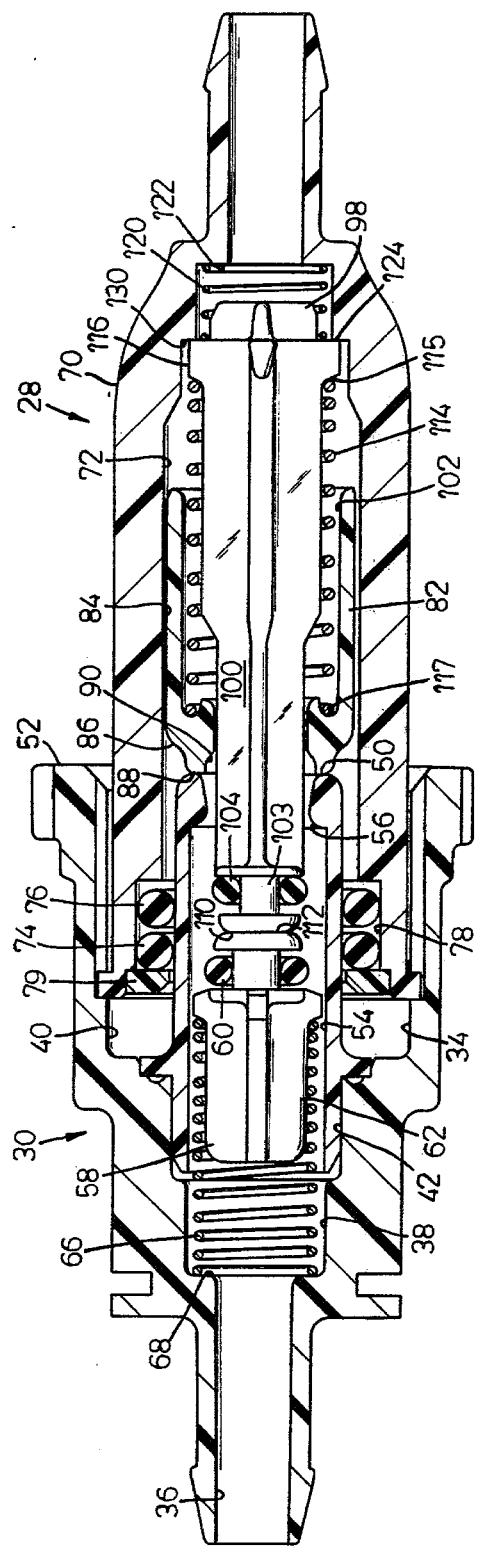

QUICK DISCONNECT FLUID LINE COUPLING

FIELD OF THE INVENTION

The invention relates to quick disconnect couplings for making and breaking connection between two fluid lines and has to do particularly with the type of coupling that incorporates automatically actuated valves for closing the end of each fluid conduit when the connection is broken. More specifically, the invention relates to that type of coupling in which minimal fluid is lost from the line at the time of making or breaking the connection.

BACKGROUND PRIOR ART

For reference to prior art couplings, attention is directed to the prior art Hengst U.S. Pat. No. 2,451,218, issued Oct. 12, 1948; the Main, Jr. U.S. Pat. No. 2,451,441, issued Oct. 12, 1948; the Main, Jr. U.S. Pat. No. 2,457,251, issued Dec. 28, 1948 and the Hansen U.S. Pat. No. 2,548,528, issued Apr. 10, 1951.

Attention is further directed to the Pearson U.S. Pat. No. 3,500,859, issued Mar. 17, 1970; the Hodson U.S. Pat. No. 3,196,897, issued July 27, 1965; and the Collar U.S. Pat. No. 3,191,972, issued June 29, 1965.

Attention is further directed to the Johnson U.S. Pat. No. 3,550,624, issued Dec. 29, 1970 and the De Visscher U.S. Pat. No. 3,777,771, issued Dec. 11, 1973.

SUMMARY OF THE INVENTION

The invention includes a fluid conduit coupling comprising first and second coupling members having means for connection to associated fluid conduits and means for connection to each other. The first coupling member includes a first body having therein a fluid flow passage, and means for selectively preventing fluid flow through the passage. The second coupling member includes a second body having therein a fluid passage, annular inner seal means housed in the second body fluid passage and adjacent one of the ends of the second coupling member, and means for selectively preventing fluid flow through the second body fluid flow passage. The fluid flow preventing means includes a movable valve sleeve housed in the fluid passage of the second body, one end of the movable valve sleeve including an annular sealing surface. The movable valve sleeve is movable between a first position wherein the annular sealing surface engages the annular inner seal means of the second body and a second position wherein the annular sealing surface is spaced from the annular inner seal means of the second body. The movable valve sleeve is engaged by the first coupling member and moved to the second position when the first and second coupling members are joined. The fluid flow preventing means also includes, a valve pin housed in the movable valve sleeve and having an end engagable with the first coupling member when the first and second coupling members are joined. The fluid flow preventing means also includes seal means supported on the end of the second valve pin and engagable in abutting relation with the movable valve sleeve, means for urging the seal means supported on the end of the second valve pin into engagement with the movable valve sleeve, and means for urging the movable valve sleeve into engagement with the annular inner seal means.

The invention further includes a fluid conduit coupling comprising first and second coupling members having means for connection to associated fluid conduits and means for connection to each other. The first coupling member includes a body having a fluid flow passage therein and means for selectively preventing fluid flow through the fluid flow passage. The fluid flow preventing means includes a first sleeve housed in the passage and including an internal sealing surface, a first movable valve pin housed in the first sleeve, the first valve pin being movable from a fluid flow preventing position wherein an end of the first valve pin is in sealing relation with the internal sealing surface to a retracted position wherein the end of the first valve pin is spaced from the internal sealing surface to permit fluid flow through the first sleeve, and means for urging the first valve pin toward the fluid flow preventing position. The second coupling member includes a second body having a fluid passage therein, seal means housed in the second body fluid passage and adjacent one of the opposite ends of the second coupling member, and the seal means being adapted to surround the first sleeve for forming a seal therebetween as the first and second coupling members are joined. The second coupling member also includes means for preventing fluid flow through the second body fluid flow passage until the second coupling member seal means and the first sleeve form a seal therebetween.

The invention also includes a fluid conduit coupling comprising first and second coupling members having means for connection to associated fluid conduits and means for connection to each other. The first coupling member includes a body having therein a fluid flow passage, and means for selectively preventing fluid flow through the passage including a first sleeve housed in the passage and having an internal sealing surface, a first movable valve pin housed in the valve insert sleeve, the first movable valve pin being movable from a fluid flow preventing position wherein an end of the first valve pin is in sealing relation with the internal sealing surface of a retracted position wherein the end of the first valve pin is spaced from the internal sealing surface to permit fluid flow through the first sleeve, and means for urging the valve pin toward the fluid flow preventing position. The second coupling member includes a second body having a fluid passage therein, seal means housed in the fluid passage adjacent one of the second coupling member ends and adapted to surround the first sleeve for forming a seal therebetween when the first and second coupling members are joined, and means for selectively preventing fluid flow through the second body fluid flow passage. The means for selectively preventing fluid flow through the second body includes a movable valve sleeve housed in the second body fluid passage, one of the ends of the movable sleeve including an annular sealing surface, the movable sleeve being movable between a first position wherein the annular sealing surface abuts the seal means in sealing relationship and a second position wherein the annular sealing surface is spaced from the sealing means, the movable sleeve being located to be engaged by the first sleeve in end-to-end abutting relationship and to be moved to the second position when the first and second coupling members are joined. The means for selectively preventing fluid flow through the second body also includes a second valve pin housed in the movable valve sleeve and having an end engageable with the first valve pin for forcing the first valve pin to the second position the first and second coupling members are joined, seal means supported on the ends of the second valve pin and selectively engagable in abutting relation with the movable valve sleeve to form a seal therebetween, means for urging the seal means supported on the end of the second valve pin into engagement with the movable valve sleeve, and means for urging the movable valve sleeve into engagement with the seal means housed in the fluid passage.

Other features and advantages of the invention are set forth in the following description and claims and in the drawings.

BRIEF DESCRIPTION OF THE DRAWINGS

FIG. 1 is a partial view of an outboard motor, a fuel tank, and a fuel line joining the fuel tank to the outboard motor, the ends of the fuel line being joined to the outboard motor and to the fuel tank by quick disconnect couplings embodying the present invention.

FIG. 2 is an enlarged cross section view of a quick disconnect coupling shown in FIG. 1 and showing the coupling members separated.

FIG. 3 is a view similar to FIG. 2 but showing the coupling members partially engaged.

FIG. 4 is a view similar to FIG. 3 but showing the coupling members fully engaged.

Before explaining the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is the engine housing 10 of an outboard motor 12. The outboard motor 12 is mounted on the transom 14 of a boat and is supported thereon by a pair of brackets 16 and 18. The outboard motor 12 is also connected to a fuel tank 20 by a fuel line 22. The fuel line 22 is joined at one of its ends to the outboard motor 12 by a quick disconnect coupling 24 and at its opposite end to the fuel tank 20 by a quick disconnect coupling 26.

In the illustrated construction, the quick disconnect couplings 24 and 26 are identical and are shown in greater detail in FIGS. 2-4. As shown therein the quick disconnect couplings 24 and 26 each include a male coupling member 28 and a female coupling member 30. While in the illustrated construction the coupling members 28 are shown as being connected to the fuel line 22 and the coupling members 30 are connected to the outboard motor 12 and the fuel tank 20, in an alternative construction the coupling members 30 could be joined to the fuel line 22 and the coupling members 28 could be joined to the outboard motor and to the fuel tank.

The coupling member 30 includes a body portion 32 having therein a stepped cylindrical bore 34. While the body portion 32 is shown in the illustrated construction as being comprised of a resilient material such as a thermoplastic, it could also be comprised of a plurality of other suitable materials including metal. The stepped cylindrical bore 34 includes stepped fluid passage portions 36 and 38 at one end of the body portion 32 and an enlarged portion 40 for housing an end of the coupling member 28. Intermediate the bore portions 38 and 40 is an additional bore portion 42 fixedly housing one end 44 of a valve insert sleeve 46, the valve insert sleeve 46 including an opposite end 48 projecting into the bore portion 40 and having an end face 50 generally co-planar with an end face 52 of the body portion 32. The end 48 of the valve insert sleeve 46 and the end portion of body portion 32 surrounding it define an annular chamber therebetween for receiving an end of the coupling member 28. The valve insert sleeve 46 also defines a central longitudinal bore 54 which comprises a fluid passage communicating with the fluid passage portions 36 and 38 of the bore 34. The projecting end 48 of the valve insert sleeve 46 is thickened internally to provide to annular sealing surface having an inside diameter less than the inside diameter of the remainder of the central bore 54 of the fluid passage of the valve insert sleeve 46. While in the illustrated construction the valve insert sleeve 46 is an integral one-piece structure and is shown as being comprised of a flexible or elastomeric material, it should be understood that the valve insert sleeve could also be comprised of a metal sleeve supporting an inner resilient seal member to form the annular sealing surface 56 on the inside of the projecting end 48 of the valve insert sleeve 46.

The coupling member 30 also includes means for selectively preventing fluid flow through the fluid passage 54 of the valve insert sleeve 46. This fluid flow preventing means includes amovable valve pin 58 housed in the fluid passage 54 in the valve insert sleeve 46 and being movable therein longitudinally. The movable valve pin 58 includes a seal supporting end having thereon an O-ring seal 60. The O-ring seal is held or restrained between an annular part on the valve pin 58 to the right of a plurality of longitudinally extending vanes 62 and an annular shoulder 64 surrounding the end of the valve pin 58. The O-ring seal 60 is adapted to abut the internal annular sealing surface 56 at the end of the valve insert sleeve 46 and to thereby prevent fluid flow through the fluid passage 54 defined by the sleeve 46.

Means are also provided for urging the movable valve pin 58 toward the sealing surface 56 and to cause abutting sealing engagement therewith of the O-ring 60. In the illustrated construction, this means comprises a helical compression spring 66 having one end engaging a shoulder 68 of the body portion 32 and another end engaging the movable valve pin 58.

The coupling member 28 of each of the quick disconnect couplings 24 and 26 includes a body portion 70 having a central stepped cylindrical bore or cavity 72. As in the case of the coupling member 30, though the body portion 70 is illustrated as being comprised of a resilient material, other suitable materials such as metal could also be employed.

The coupling member 28 includes a pair of parallel abutting O-ring seals 74 and 78 housed within a relatively large diameter portion 78 of the central stepped cylindrical cavity 72 adjacent one end of the body portion 70, the O-ring seals 74 and 76 being fixedly retained therein between an annular retaining ring 79 and a shoulder 80 of the body portion 70 of the coupling member 28. While O-ring seals 74 and 76 are illustrated, it is also contemplated that other suitable means such as a quad bone seal could be used as a suitable alternative.

The coupling member 28 also includes a movable valve sleeve 82 slidably housed within a central portion 84 of the stepped cylindrical bore or cavity 72, the valve sleeve 82 being supported for movement longitudinally toward and away from the O-ring seals 74 and 76. In the illustrated construction, the end 88 of the movable valve sleeve 82 adjacent the O-ring seals 74 and 76 is provided with two annular mutually concentric sealing surfaces 86 and 90. The outer sealing surface 86 is provided by a peripheral shoulder portion 92 of the movable sleeve 82 and is adapted to engage the O-ring seal 76 in abutting relation as will be described hereinafter. The end of the movable valve sleeve 82 adjacent the O-ring seals 74 and 76 also includes an annular longitudinally projecting portion 94 which faces and is engageable with the opposed annular end 50 of the valve insert sleeve 46 of the other coupling member 30. The end 88 of the movable valve sleeve 82 adjacent the O-ring seals 74 and 76 also includes an internally thickened portion 96 functioning to provide the inner annular shoulder forming the sealing surface 90.

Means are also provided to selectively prevent fluid flow through the fluid passage 72 of the coupling member 28 when the coupling members 28 and 30 are separated and to permit fluid flow through the coupling member 28 when the coupling members are forced together in coupling relationship. In the illustrated construction, the selective fluid flow preventing means includes a movable valve pin 98 which is housed in the stepped central fluid passage 72 of the valve body portion 70, which has an end 100 extending through the central longitudinal bore 102 of the movable sleeve 82, and which is adapted to engage the other coupling member 30. The end 100 of the valve pin 98 includes a small diameter cylindrical portion 103 adapted to support an O-ring seal 104, the O-ring seal 104 being restrained between an annular part on the valve pin 98 to the left of a plurality of longitudinally extending vanes 106 integral with the valve pin 98, and an annular flange 108 surrounding the end of the valve pin. The end of the valve pin 98 and the annular flange 108 also function to define a generally planar end surface 110 adapted to abut the opposed planar end 112 of the movable valve pin 58 of the coupling member 30 when the coupling members are forced together in coupling relation and to thereby force that valve pin to its retracted position wherein fluid flow through the coupling member 30 is permitted.

Means are also provided for urging the movable valve sleeve 82 into engagement with the O-ring seal 104 surrounding the end of the valve pin 98 and to thereby cause sealing engagement between the O-ring seal 104 and the internal surface 90 of the movable valve sleeve 82. This means comprises a helical compression spring 114 positioned between the forward annular face 115 of the annular flange 116 and a spring seat 117 on the movable valve sleeve 82.

Means are further provided for biasing the movable valve sleeve 82 into engagement with the seal 76. This means comprises a helical compression spring 120 positioned between a shoulder portion 122 of the coupling member body portion 70 and rearward annular face 124 of the annular flange 116 of the movable valve pin 98.

Operation of the above described components during coupling of the coupling members 28 and 30 is illustrated in FIGS. 2 through 4. As illustrated in FIG. 2, when the coupling members 28 and 30 are separated, they provide sealed closures for the respective fluid conduits to which they are attached. More specifically, referring to the coupling member 30, the O-ring seal 60 supported by the end of the movable valve pin 58 is forced by the helical compression spring 66 into abutting engagement with the sealing surface 56 of the fixed valve sleeve 46 and thereby prevents fluid flow through the coupling member 30. Referring to the other coupling member 28, the helical compression spring 114 functions to maintain a sealing relationship between the O-ring seal 104 supported on the valve pin 98 and the sealing surface 90 of the movable valve sleeve 82. The second helical compression spring 120 functions to bias the movable valve pin 98 and the movable sleeve 82 toward the O-ring seal 76 to thereby maintain sealing engagement between the annular sealing surface 86 of the movable valve sleeve 82 and the O-ring seal 76.

When the coupling members 28 and 30 are then moved into coupling engagement as shown in FIG. 3, as the body 70 of the coupling member 28 is inserted into the annular chamber 40 of the coupling member 30, the projecting end 48 of the fixed valve sleeve 46 of the coupling member 30 is slidably received in sealing relation within the O-ring seal 74 and then abuts the end 88 of the movable valve sleeve 82.

In the illustrated construction, the fixed valve sleeve 46 and the movable valve sleeve 82 are shown as being comprised of a plastic material. It should also be recognized that the valve sleeves could similarly be constructed of non-plastic materials such as metal.

When the coupling members 28 and 30 are in the position shown in FIG. 3, a fluid-tight seal is formed between the external cylindrical surface of the fixed valve sleeve 46 and the internal sealing surface of the O-ring seal 74. Accordingly, in this position a fluid-tight seal is formed between the coupling members 28 and 30 while the valve pins 58 and 98 and the associated seal structures contained within the coupling members 28 and 30 still prevent fluid flow through the couplings.

When the coupling members 28 and 30 are forced into further coupling engagement as shown in FIG. 4, movement to the right of the fixed valve sleeve 46 of the coupling member 30 will force the movable valve sleeve 82 to the right and away from the O-ring seal 76. This movement to the right of the movable valve sleeve 82 causes increased compression of the helical coil spring 114 thereby overcoming the force of the second compression spring 120 and causing the movable valve pin 98 to move into engagement with the shoulder 130 of the coupling member body portion 70. Continued movement of the sleeve 44 inwardly of the member 28 serves to displace the sleeve 82 further to the right relative to the valve pin 98 and causes separation of the sealing surface 90 and the O-ring seal 104. At the same time, abutment of the surfaces 110 and 112 of the valve pins 98 and 58 during continued movement to the right of the member 30, causes the O-ring 60 to move to the left relative to the seal 56. Fluid is then permitted to flow through fluid passage 72 of coupling member 28 and along the vanes 106, through the bore 102 of the sleeve 82, past sealing surface 90, past the sealing surface 56, through the bore 54, around the O-ring seals 104 and 60, and then along the vanes 62 of the valve pin 58 and through fluid passage portions 38 and 36 of coupling member 30.

When the coupling members 28 and 30 are subsequently disengaged, as shown in FIG. 3, the valve components of the coupling members will then return to positions in sealing engagement with complementary sealing surfaces to thereby prevent fluid flow from the coupling members. As the coupling members 28 and 30 are disengaged, the valve pin 98 is moved away from the pin 58 thereby permitting the O-ring seal 60 to engage the sealing surface 56, and the sealing surfaces 86 and 90 will move into sealing engagement with the seal 76 and O-ring seal 104, respectively, as shown in FIG. 3. In this position a fluid seal is still maintained between seal 74 and the fixed valve sleeve 44. As the coupling members 28 and 30 are further separated, the end 48 of the fixed valve sleeve 44 is withdrawn from the seal 74. Since sealing engagement of the valve components of the coupling members occurs before the seal between the respective coupling members is broken, fluid loss when disconnecting the coupling members is minimal and there is no discharge of fluid under pressure during the disconnection. The only fluid allowed to escape upon disconnection is that left in the relatively small chamber 132 shown in FIG. 3. The design of the coupling members is such that the volume of that chamber 132 is minimal.

While the illustrated construction shows a bayonette latch means for joining the coupling members, various other suitable means may be provided to permit easy engagement and disengagement of the coupling members and also to prevent accidental disengagement.

One of the advantages of the disclosed coupling members is the inclusion of spring loaded abutting seals rather than sliding seals. Accordingly, the problems incident to sticking sliding O-ring seals and resultant leakage are avoided.

Another of the advantages of the construction of the coupling members lies in the provision of movable valve pins which are supported between compression springs and wherein the longitudinal position of the valve pin 98 is controlled by the relative compression of two opposed compression springs. Accordingly, the fluid-tight seal between the movable sleeve and the O-ring seal can be abutting seals and the seal between the sleeve and the O-ring seal of the coupling member body are also abutting seals. Additionally, this construction also eliminates the effect of both linear tolerance stack-up and concentricity problems.

Various features of the invention are set forth in the following claims.

We claim:

1. A fluid conduit coupling comprising first and second coupling members having means for connection to associated fluid conduits and means for connection to each other, said first coupling member including a first body having therein a fluid flow passage, and means for selectively preventing fluid flow through said fluid flow passage, said second coupling member having opposite ends and including a second body having therein a fluid passage, annular inner seal means housed in said second body fluid passage and adjacent one of said second coupling member ends, means for selectively preventing fluid flow through said second body fluid flow passage, said fluid flow preventing means including a movable valve sleeve housed in said second body fluid passage and having opposite ends, one of said movable valve sleeve ends including an annular sealing surface, said movable valve sleeve being movable between a first position wherein said annular sealing surface engages said annular inner seal means and a second position wherein said annular sealing surface is spaced from said annular inner seal means, said movable valve sleeve being engaged by said first coupling member and being moved to said second position when said first and second coupling members are joined, a valve pin housed in said movable valve sleeve and having an end engagable with said first coupling member when said first and second coupling members are joined, seal means supported on said end of said valve pin and engagable with said movable valve sleeve, means including spring means surrounding said valve pin and compressed between a portion of said valve pin and a portion of said movable valve sleeve for urging said seal means supported on said end of said valve pin into engagement with said movable valve sleeve, and means including a compression spring between said valve pin and said second coupling member body for urging said movable valve sleeve into engagement with said annular inner seal means.

2. A fluid conduit coupling comprising first and second coupling members having means for connection to associated fluid conduits and means for connection to each other, said first coupling member including a body having therein a fluid flow passage, and means for selectively preventing fluid flow through said passage including a fixed sleeve partially defining said passage and having an internal sealing surface, a first movable valve pin housed in said fixed sleeve, said first movable valve pin being movable from a fluid flow preventing position wherein an end of said first valve pin is in sealing relation with said internal sealing surface to a retracted position wherein said end of said first valve pin is spaced from said internal sealing surface to permit fluid flow through said fixed sleeve, and means for urging said first valve pin toward said fluid flow preventing position, said second coupling member having opposite ends and including a second body having a fluid passage therein, first seal means housed in said fluid passage adjacent one of said second coupling member ends and adapted to surround said fixed sleeve for forming a seal therebetween when said first and second coupling members are joined, and means for selectively preventing fluid flow through said second body fluid flow passage, said fluid flow preventing means including a movable valve sleeve housed in said second body fluid passage and having opposite ends, one of said movable sleeve ends including an annular sealing surface, said movable sleeve being movable between a first position wherein said annular sealing surface abuts said first seal means in sealing relationship and a second position wherein said annular sealing surface is spaced for said first seal means, said movable valve sleeve being located to be engaged by said fixed sleeve in end-to-end abutting relationship and to be moved to said second position when said first and said second coupling members are joined, a second valve pin housed in said movable valve sleeve and having an end engageable with said first valve pin for forcing said first valve pin to said second position when said first and second coupling members are joined, second seal means supported on said end of said second valve pin and selectively engageable in abutting relation with said one of said ends of said movable valve sleeve to form a seal therebetween when said movable valve sleeve is in said first position, means including spring means surrounding said second valve pin and compressed between said second valve pin and said movable valve sleeve for urging said second seal means into engagement with said movable valve sleeve, and means including a compression spring between said second valve pin and said second coupling member body for urging said movable valve sleeve into engagement with said first seal means.

3. A fluid conduit coupling as set forth in claim 2 wherein said end of said first movable valve pin supports a seal for abutting said internal sealing surface of said first sleeve when said first valve pin is in said fluid flow preventing position.

4. A fluid conduit coupling as set forth in claim 2 wherein said second valve pin and said first movable valve pin are engagable in end-to-end aligned abutting relation when said coupling members are joined.

5. A fluid conduit coupling as set forth in claim 2 wherein said means for urging said first valve pin toward said fluid flow preventing position comprises a compression spring having one end supported by said body of said first coupling member and an opposite end engaging said first movable valve pin.

* * * * *